(12) United States Patent
Bellis

(10) Patent No.: US 8,096,106 B2
(45) Date of Patent: Jan. 17, 2012

(54) DRIVE MECHANISM

(75) Inventor: Mark John Edwin Bellis, Derby (GB)

(73) Assignee: Rolls-Royce, PLC (GB)

(*) Notice: Subject to any disclaimer, the term of this patent is extended or adjusted under 35 U.S.C. 154(b) by 0 days.

(21) Appl. No.: 12/756,561

(22) Filed: Apr. 8, 2010

(65) Prior Publication Data
US 2010/0263351 A1    Oct. 21, 2010

(30) Foreign Application Priority Data

Apr. 21, 2009 (GB) .................................. 0906736.4

(51) Int. Cl.
*F02K 3/00* (2006.01)
*F16H 29/20* (2006.01)
*B64C 27/10* (2006.01)

(52) U.S. Cl. .................... 60/268; 74/89.21; 415/128

(58) Field of Classification Search .......... 60/39.162, 60/39.45, 268; 415/68, 69; 416/128, 129, 416/130, 147, 155, 156; 74/89.2, 89.21; 180/350, 357; 280/250, 261
See application file for complete search history.

(56) References Cited

U.S. PATENT DOCUMENTS

| | | | |
|---|---|---|---|
| 3,691,871 A * | 9/1972 | Gladow et al. | 475/182 |
| 4,321,842 A | 3/1982 | Stromotich | |
| 6,239,524 B1 * | 5/2001 | Leibowitz | 310/112 |

FOREIGN PATENT DOCUMENTS

| | | |
|---|---|---|
| FR | 2873420 | 1/2006 |
| GB | 2004346 | 3/1979 |

* cited by examiner

*Primary Examiner* — Ehud Gartenberg
*Assistant Examiner* — Arun Goyal
(74) *Attorney, Agent, or Firm* — McCormick, Paulding & Huber LLP

(57) ABSTRACT

A drive mechanism comprising a first sprocket encircled by a tensioned chain and an orbit sprocket arranged to orbit the first sprocket in response to a resynchronisation signal. The orbit sprocket is arranged to displace the tensioned chain relative to the first sprocket. The first sprocket is rotatable and is coupled to an output drive sprocket by the tensioned chain such that the first and output drive sprockets are rotatable in synchronicity, whereby the orbit of the orbit sprocket alters the relative angular orientation of the first and output drive sprockets.

15 Claims, 6 Drawing Sheets

DRIVE MECHANISM

CROSS REFERENCE TO RELATED APPLICATION

This application is entitled to the benefit of British Patent Application No. GB 0906736.4, filed on Apr. 21, 2009.

FIELD OF THE INVENTION

The present invention relates to a drive mechanism. It finds utility in a wide variety of fields including varying the pitch of the rotor blades of a rotor stage of a gas turbine engine.

BACKGROUND OF THE INVENTION

Chain precession drive mechanisms are known in the art and are used to achieve higher gear ratios than are possible with conventional gear trains. A typical chain precession drive mechanism is described with reference to FIG. 1 and FIG. 2. A first sprocket is connected via an output shaft to a driven device which may be, for example, a pitch change arrangement for a set of rotor blades. Thus rotation of the first sprocket causes rotation of the driven device. There may be a gear train (not shown) to adjust the gear ratio between the first sprocket and the driven device. Encircling the first sprocket is a tensioned chain that is longer than the circumference of the first sprocket. The tensioned chain is held in tension by a tensioning arrangement which exerts a force, downward as illustrated, to take up the slack in the chain. The tensioning arrangement may purely rely on gravity but is more preferably a spring or similar that is constrained to move in a straight line towards or away from the first sprocket, for example in a slide track.

An orbit sprocket is arranged to be coplanar with the first sprocket and to be located within the length of the tensioned chain. A motor drives an input shaft that is coaxial with the output shaft. There is an arm extending perpendicularly from the input shaft and connected by one of its ends thereto. The orbit sprocket is connected to the other end of the arm so that rotation of the input shaft causes the orbit sprocket to orbit the first sprocket at a radius greater than the radius of the first sprocket. The track of the orbit sprocket around the first sprocket is shown in FIG. 2. There may be static structures to give rigidity to the mechanism and for mounting the shafts and sprockets.

The driven device is held stationary when the input shaft is not rotating. When the motor drives the input shaft in response to a resynchronisation signal, the orbit sprocket orbits the first sprocket which displaces the tensioned chain and causes the tensioning arrangement to release at least some of the slack to accommodate encircling the orbit sprocket as well as the first sprocket. Precession of the orbit sprocket first decouples a given link of the tensioned chain from the first sprocket and then permits it to recouple to a different tooth of the first sprocket. Once the orbit sprocket has completed one revolution around the first sprocket and returned to the position shown in FIG. 1 and FIG. 2, the tensioned chain has been displaced relative to the first sprocket by a known amount. Since the tensioned chain does not rotate, but only moves radially, the first sprocket has therefore been rotated by that known amount. Hence the driven device is stepped by this amount, or a scaled amount if a gear train providing a gear ratio is used. For example, for a mechanism in which the tensioned chain has N chain links and the first sprocket has M teeth, the output shaft rotates in the opposite direction at (N−M)/M times the input shaft speed.

The motor may drive the input shaft continuously to effect a high ratio gearing between the input and output shafts. The output shaft can be held at any position by arresting movement of the orbit sprocket but least wear is offered by arresting the movement where the orbit sprocket is decoupled from the tensioned chain 36, as shown in FIG. 2.

One disadvantage of this mechanism is that in order to drive a device located in a rotating frame of reference, for example to control the pitch of a set of rotating rotor blades, it is necessary to rotate the input motor. This may be complex to implement and may require electrical and hydraulic signals to traverse the stationary-rotating boundary in order to provide the resynchronisation signal. Where the mechanism is used to control the pitch of a rear set of rotor blades in a dual row rotor system, for example in a gas turbine engine having contra-rotating propeller stages in a pusher configuration, the complexity is significantly increased because the control signals are typically generated in the stationary frame of reference and must pass through the front rotating frame of reference to control the rotor blades in the rear rotating frame of reference. The same problem occurs where the mechanism is used to control the pitch of a front set of rotor blades in a dual rotor system in a puller configuration.

A further disadvantage is that the chain precession drive mechanism can be back-driven by the load if the motor is not able to hold the variable load of the driven device. This is the case if the mechanism is used to control the pitch of rotor blades in a rotor stage where the aerodynamic loading on the rotor blades may drive the pitch change mechanism against the motor. Therefore a "no-back" device is required, adding weight and complexity to the mechanism. The present invention seeks to provide a drive mechanism that seeks to address the aforementioned problems.

SUMMARY OF THE INVENTION

Accordingly the present invention provides a drive mechanism that has a first sprocket encircled by a tensioned chain; an orbit sprocket arranged to orbit the first sprocket in response to a resynchronisation signal, the orbit sprocket arranged to displace the tensioned chain relative to the first sprocket characterised in that the first sprocket is rotatable and is coupled to an output drive sprocket by the tensioned chain such that the first and output drive sprockets are rotatable in synchronicity, whereby the orbit of the orbit sprocket alters the relative angular orientation of the first and output drive sprockets. This arrangement has the advantage that the resynchronisation is decoupled from the output drive so that the mechanism cannot be back-driven by the driven load. Other advantages will become apparent from the subsequent detailed description.

The first sprocket may be coupled to a reference rotation source and the output drive sprocket may be coupled to a driven device. The output drive sprocket may be coupled to the driven device via a gear train, which may be a reduction gear train.

The tensioned chain may be tensioned by a biased sprocket.

The resynchronisation signal may activate a motor that causes the orbit sprocket to orbit the first sprocket.

The first sprocket may be in one frame of reference and the driven device in another frame of reference. The frames of reference may rotate with respect to each other. One frame of reference may be stationary.

A further orbit sprocket may be arranged to orbit the output drive sprocket to further alter the relative angular orientation of the first and output drive sprockets. Two or more output drive sprockets may be coupled to the first sprocket by the tensioned chain, each having a further orbit sprocket arranged to orbit it to alter the relative angular orientation of the first sprocket and the output drive sprocket that is orbited.

A further aspect of the present invention provides a drive arrangement comprising two or more drive mechanisms as described above, the two or more drive mechanisms being coupled together.

The reference rotation source may be a rotor stage of a gas turbine engine. The driven device may be a rotor pitch mechanism.

Another aspect provides a contra-rotating propeller gas turbine engine comprising a drive mechanism as described above.

DETAILED DESCRIPTION OF THE PREFERRED EMBODIMENTS

Figure 1:
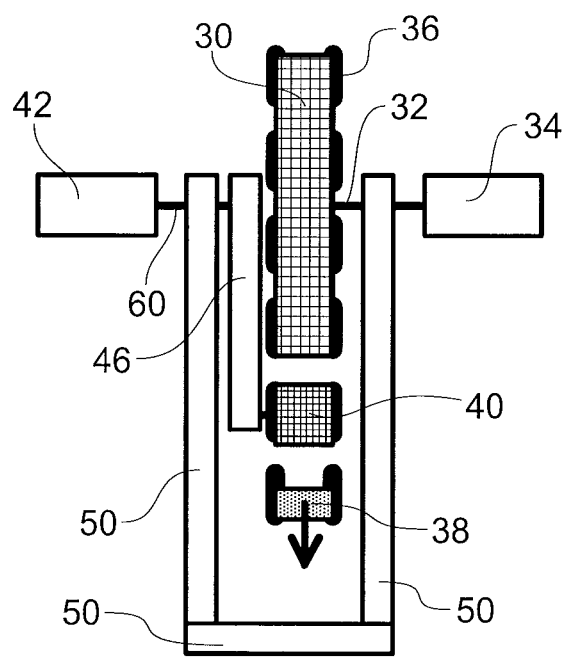
FIG. 1 and FIG. 2 are, respectively, a schematic and an axial view of a chain precession drive mechanism according to the prior art as described above.
Figure 2:
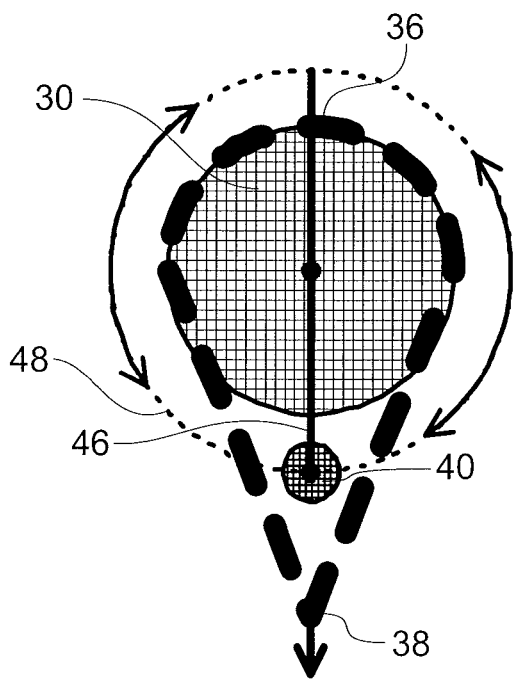
Figure 3:
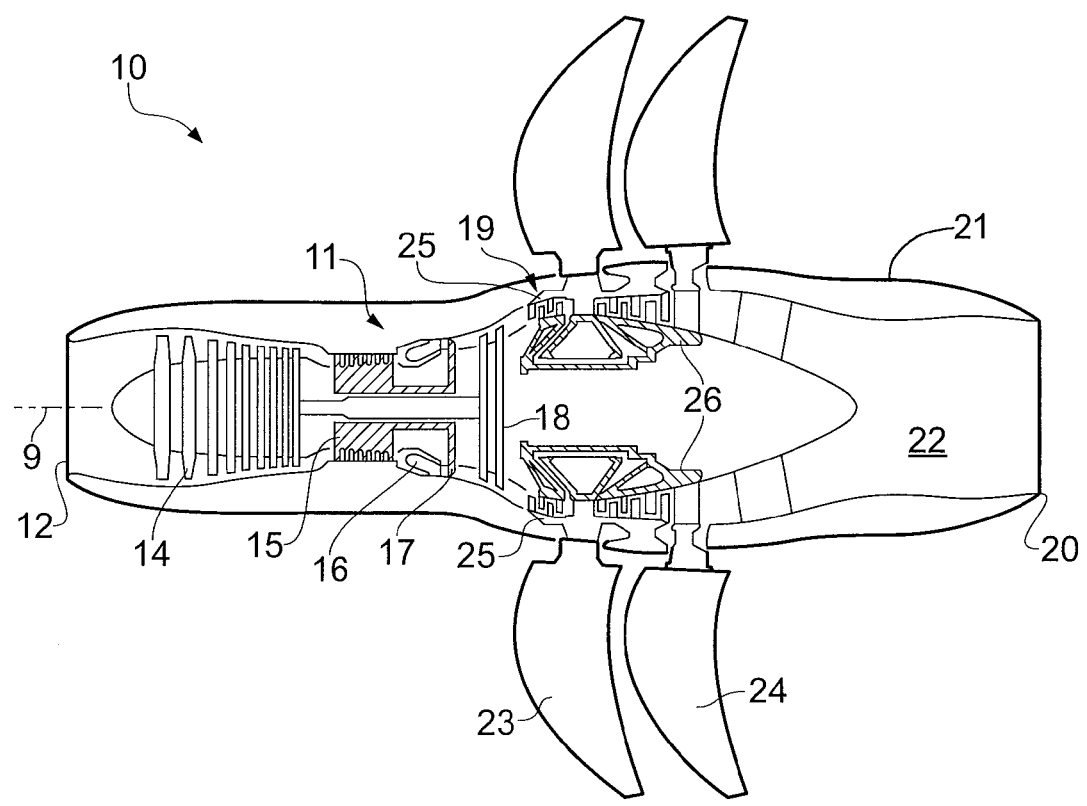
FIG. 3 is a sectional side view of a gas turbine engine having contra-rotating propeller stages.

Referring to FIG. 3, a twin-spooled, contra-rotating propeller gas turbine engine is generally indicated at 10 and has a principal and rotational axis 9. The engine 10 comprises a core engine 11 having, in axial flow series, an air intake 12, an intermediate pressure compressor 14, a high-pressure compressor 15, combustion equipment 16, a high-pressure turbine 17, a low pressure turbine 18, a free power turbine 19 and a core exhaust nozzle 20. A nacelle 21 generally surrounds the core engine 11 and defines the intake 12 and nozzle 20 and a core exhaust duct 22. The engine 10 also comprises two contra-rotating propellers 23, 24 attached to and driven by the free power turbine 19, which comprises contra-rotating blade arrays 25, 26. The pitch of the propellers 23, 24 is controlled by a drive mechanism according to the present invention, as described below.

The gas turbine engine 10 works in a conventional manner so that air entering the intake 12 is accelerated and compressed by the intermediate pressure compressor 14 and directed into the high pressure compressor 15 where further compression takes place. The compressed air exhausted from the high pressure compressor 15 is directed into the combustion equipment 16 where it is mixed with fuel and the mixture combusted. The resultant hot combustion products then expand through, and thereby drive the high, low-pressure and free power turbines 17, 18, 19 before being exhausted through the nozzle 20 to provide some propulsive thrust. The high, low-pressure and free power turbines 17, 18, 19 respectively drive the high and intermediate pressure compressors 15, 14 and the propellers 23, 24 by suitable interconnecting shafts. The propellers 23, 24 normally provide the majority of the propulsive thrust.

Figure 4:
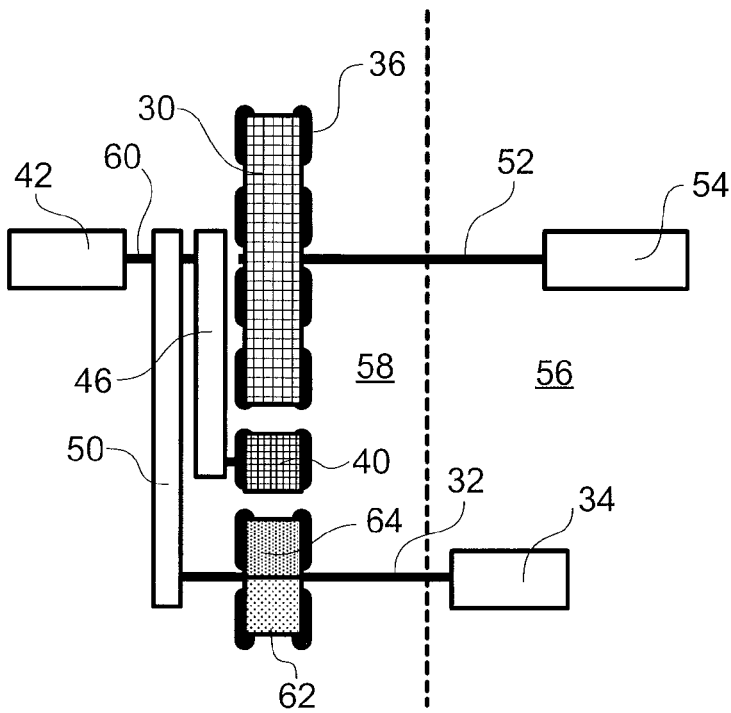
FIG. 4 is a schematic view of a drive mechanism according to the present invention.
Figure 5:
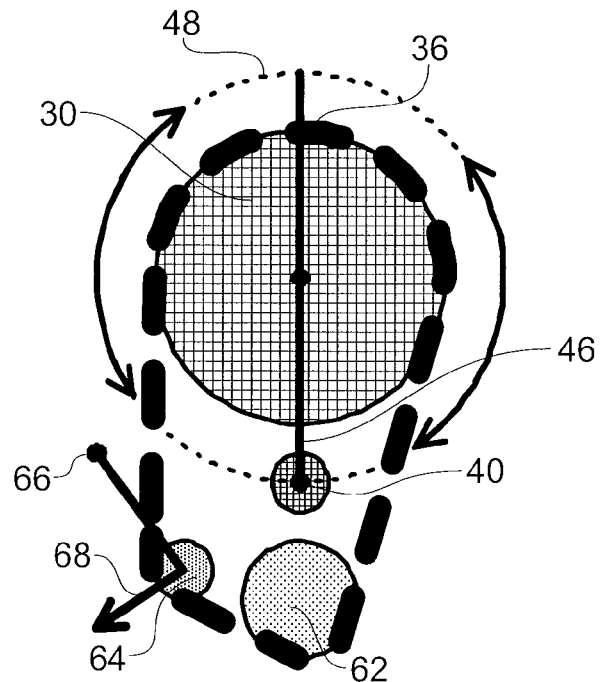
FIG. 5 is an axial view of a drive mechanism according to the present invention.

A first, exemplary embodiment of the drive mechanism of the present invention is shown in FIG. 4 and FIG. 5. The first sprocket 30 in this case is rotatable, being driven via the first input shaft 52 by a reference rotation source 54. The reference rotation source 54 may be, for example, a rotor stage of a contra-rotating propeller gas turbine engine 10. The first sprocket 30 is located in a static frame of reference 58 whilst the reference rotation source 54 is in a rotating frame of reference 56. As in the prior art arrangement, a motor 42 drives a second input shaft 60 to which is connected an orbit sprocket 40 via an arm 46 that extends perpendicularly from the second input shaft 60. The orbit sprocket 40 is coplanar with the first sprocket 30 and has an orbit radius that is greater than the radius of the first sprocket 30 so that movement in either direction around its orbit track 48 is accomplished without interference or direct contact between the sprockets 30, 40.

A tensioned chain 36 encircles the first sprocket 30 and is of greater length than the circumference of the first sprocket 30. Also within the perimeter of the tensioned chain 36 are an output drive sprocket 62 and a biased sprocket 64. The output drive sprocket 62 is connected via an output shaft 32 to a driven device 34, such as a rotor pitch change mechanism. The biased sprocket 64 is coplanar with the first and output drive sprockets 30, 62 but is offset when viewed in the axial direction. It is hinged at a pivot point 66 and biased away from the first and output drive sprockets 30, 62, as shown by arrow 68, to maintain the tension of the tensioned chain 36. The first sprocket 30 is rotated by the reference rotation source 54 which causes the output drive sprocket 62, by the connection between the links of the tensioned chain 36 with the teeth of each of the first sprocket 30 and the output drive sprocket 62, to rotate in synchronicity with the first sprocket 30. The biased sprocket 64 pivots to take up any slack in the tensioned chain 36.

Figure 7:
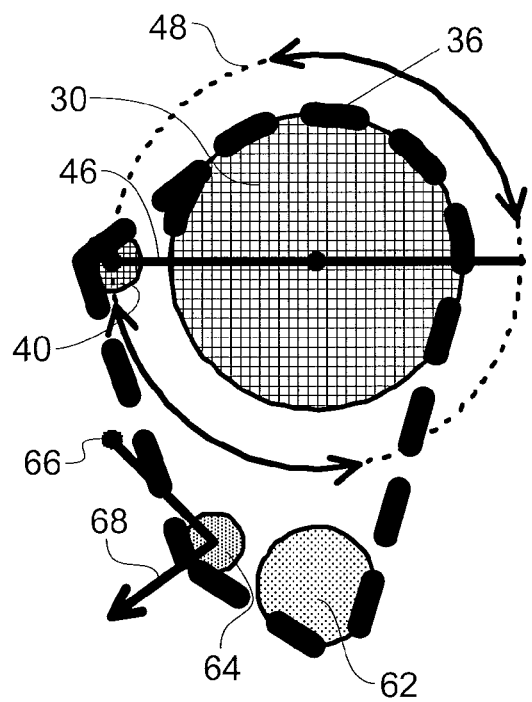
FIG. 7, is an axial view similar to FIG. 5 and showing a position of an orbit sprocket about a first sprocket in the resynchronisation of the drive mechanism according to the present invention.
Figure 8:
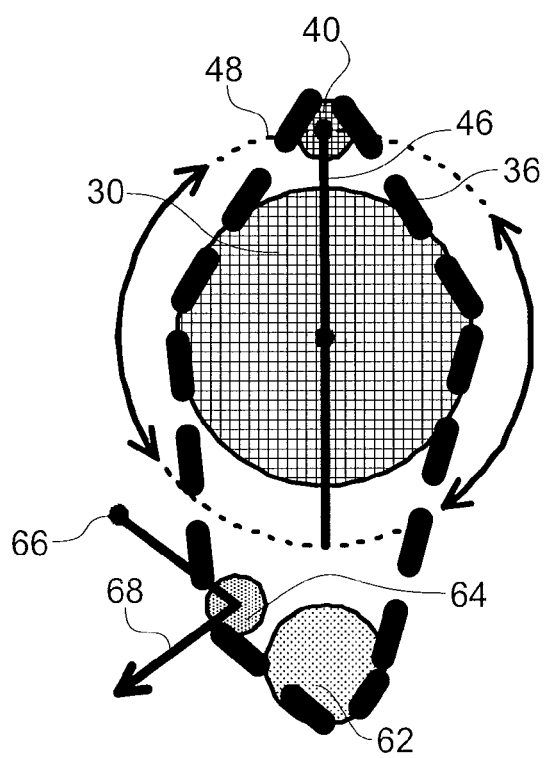
FIG. 8 is an axial view of the sprockets of FIG. 7 progressed to a second position subsequent to that of FIG. 7.
Figure 9:
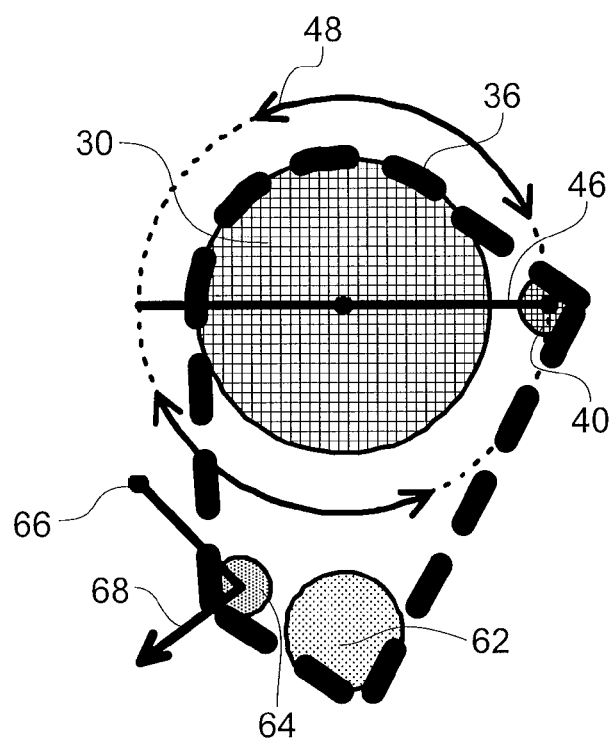
FIG. 9 is an axial view of the sprockets of FIG. 7 progressed to a position subsequent to that of FIG. 8.

When it is desired to change the angular orientation of the output drive sprocket 62, and therefore the driven device 34, relative to the first sprocket 30, and therefore the reference rotation source 54, a resynchronisation signal is generated that activates the motor 42. This causes the orbit sprocket 40 to move around the first sprocket 30 which displaces the tensioned chain 36 away from connection with the teeth thereof. Alternatively the orbit sprocket 40 need not have teeth but may interact with the tensioned chain 36 in a different manner to minimise the wear on the chain 36 and the orbit sprocket 40. The progression of the orbit sprocket 40 around the first sprocket 30 in a clockwise direction is shown in FIG. 7 to FIG. 9. As the orbit sprocket 40 increases the amount of the tensioned chain 36 required in the vicinity of the perimeter of the first sprocket 30, the biased sprocket 64 is pivoted about point 66 to be pulled closer to the output drive sprocket 62 and/or the first sprocket 30 to release some of the tensioned chain 36. Similarly, as the orbit sprocket 40 returns to the position shown in FIG. 5 the biased sprocket 64 takes up the slack in the tensioned chain 36 by pivoting away from the first sprocket 30 and the output drive sprocket 62. A complete revolution of the orbit sprocket 40 around the first sprocket 30 displaces the tensioned chain 36 circumferentially with respect to the first sprocket 30 and thereby displaces the relative angular orientation of the first sprocket 30 and the output drive sprocket 62 by a known amount. As with the prior art arrangement, the amount of relative displacement is a function of the number of teeth on the first sprocket 30 and the number of links in the tensioned chain 36.

Unlike the prior art arrangement, however, the first sprocket 30 constantly rotates in synchronicity with the reference rotation source 54. Thus, the tensioned chain 36 also rotates in synchronicity when the orbit sprocket 40 is disengaged from the first sprocket 30. When the orbit sprocket 40 is moved around the first sprocket 30 parts of the tensioned chain 36 are sequentially decoupled and then recoupled to the teeth of the first sprocket 30 whilst the tensioned chain 36 as a whole continues to be rotated by the rotation of the first sprocket 30. A new relative angular orientation can be maintained by arresting the movement of the orbit sprocket 40. Preferably the orbit sprocket 40 is stopped when it is in approximately the position shown in FIG. 5 so that it is not engaged with the tensioned chain 36. This minimises the wear on all the components and ensures that the step change in relative angular orientation is exactly known. However, if a smaller step change is required the orbit sprocket 40 may be stopped at a different position on its orbit track 48 around the first sprocket 30.

Figure 6:
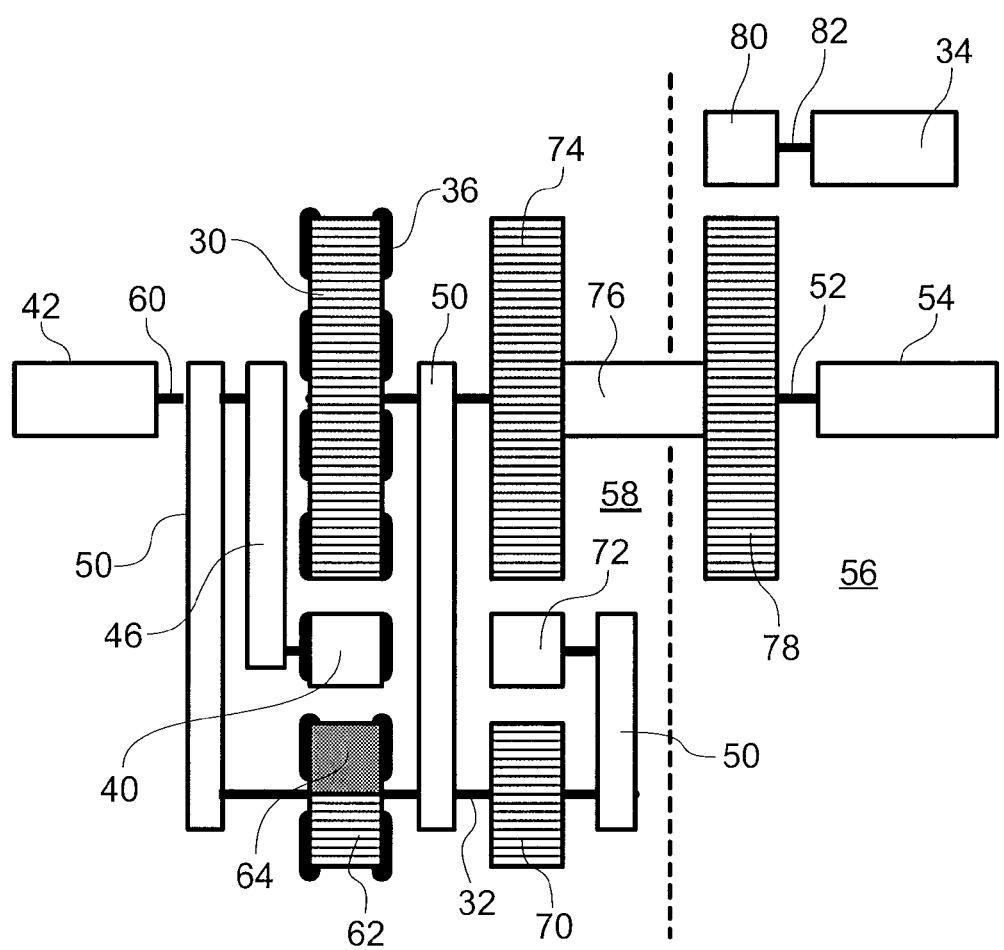
FIG. 6 is a schematic view, similar to FIG. 4, showing an embodiment of the present invention including a gear train.

A second embodiment of the drive mechanism of the present invention is shown in FIG. 6 which comprises all the components of the arrangement shown in FIG. 4, some of which are differently arranged. The reference rotation source 54 drives the first sprocket 30 as in the first embodiment. The first input shaft 52 is the inner shaft of a pair of coaxial and concentric shafts, the second of which is part of an output drive gear train. Instead of the output drive sprocket 62 being directly connected to the driven device 34 there is a series of gears between the two. The output drive sprocket 62 is connected via an output shaft 32 to a first drive gear 70 which meshes with an intermediate gear 72 that is mounted from static structure 50. The output shaft 32 is also supported by the static structure 50. Diametrically opposite to the first drive gear 70 and intermeshing with the intermediate gear 72 is a first ring gear 74 supported by the static structure 50. This first ring gear 74 is connected via the outer shaft 76 across the interface between the rotating frame of reference 56 and the static frame of reference 58 to a second ring gear 78. At least one second drive gear 80 is arranged around the circumference of the second ring gear 78 to intermesh therewith. Each of the at least one second drive gears 80 is connected via a second output drive shaft 82 to a driven device 34.

By appropriate relative sizing of the drive gears 70, 80, the intermediate gear 72 and the ring gears 74, 78 any gear ratio may be achieved between the one or more driven devices 34, via second drive gears 80, and the reference rotation source 54. For example, in applications where it is required that the second ring gear 78 should rotate in synchronisation with the reference rotation source 54, except when the orbit sprocket 40 is rotated around the first sprocket 30 to change the phase relationship and resynchronise the relative angular orientation, the gear ratio between the first ring gear 74 and the first drive gear 70 should match the gear ratio between the first sprocket 30 and the output drive sprocket 62. The radius of the orbit track 48 determines the amount of rotational offset caused by a single revolution of the orbit sprocket 40 around the first sprocket 30.

The drive mechanism of the present invention enables a motor 42 in the static frame of reference 58 to move a driven device 34 in the rotating frame of reference 56, which has the advantage of being less complex and prone to failure than prior art arrangements that require the motor to reside in the rotating frame of reference 56. The present invention also enables multiple driven devices 34 to be driven from a single reference rotation source 54, with the resultant weight and cost benefits. Advantageously, the driven devices 34 may be driven at different angular velocities by appropriate sizing of the second drive gears 80. The adjustment of the relative angular orientation is by discreet steps of known size. The gear ratios can be arranged to ensure that the orbit sprocket 40 moves once around the first sprocket 30 to provide the desired discreet step, so that wear on the components caused by irregular tension is minimised. If the situation requires it, the orbit sprocket 40 can be actuated to move around the first sprocket 30 more than once in order to offset the output drive sprocket 62 from the first sprocket 30 by a multiple of the basic discreet step size. In extraordinary circumstances the orbit sprocket 40 may be arrested part way around its orbit track 48 in order to provide a smaller relative angular orientation shift.

In normal circumstances the orbit sprocket 40 is stopped in the position shown in FIG. 5. Advantageously, in this location the mechanism cannot be back driven by load torque on the driven device 34, for example aerodynamic load on rotor blades. Thus, the output drive sprocket 62 and driven device 34 remain in rotational synchronicity with the first sprocket 30 and the reference rotation source 54.

The present invention may be applied to any differential rotor system such as a dual row propeller, a contra-rotating propeller gas turbine engine, a helicopter rotor system or a marine propeller. In all these cases there are weight, cost and complexity benefits to mounting the motor that effects the differential in a static frame of reference whilst the effect is apparent in a rotating frame of reference. Although the drive mechanism of the present invention has been described with the reference rotation source 54 and the at least one driven device 34 being in the rotating frame of reference 56 and the sprockets 30, 40, 62 being in a static frame of reference 58 these may be reversed with equal felicity in other applications so that the sprockets 30, 40, 62 could be located in a rotating frame of reference and the reference rotation source 54 could be located in a static frame of reference or a different rotating frame of reference to the sprockets 30, 40, 62. This may be of particular benefit where the present invention is applied in a dual row propeller application.

The output gear train may be angled relative to the plane of the sprockets 30, 40, 62 in order to minimise the consequences of a failure in one or more of the gears. The components can be arranged so that the at least one driven device 34 moves in a known, failsafe direction in the event of such a failure. This may be achieved by making the gear ratio of the output gear train dissimilar to the gear ratio between the first sprocket 30 and the output drive sprocket 62 to bias the movement of at least one driven device 34 in the event of the mechanism jamming. However, this arrangement would require continual input from the motor 42 to keep the at least one driven device 34 synchronised, within tolerable limits, with the reference rotation source 54.

Although specific embodiments have been described and discussed the invention may be altered by substitution or modification of any of the components without deviating from the inventive concept herein described. For example, the motor 42 may be any source of rotational torque or power. There may be one or more redundant tensioned chains 36 or other components to enhance reliability of the drive mechanism and/or minimise the consequences of at least some failure cases. The tensioned chain 36 may be replaced by a toothed belt with the first sprocket 30, output drive sprocket 62, biased sprocket 64 and orbit sprocket 40 having complementary indentations. The sprockets 30, 40, 62 and tensioned chain 36 or belt may have any suitable coarse or fine tooth pitch, which is preferably complementary to improve the interaction.

The biased sprocket 64 may be biased by any known method including, but not limited to, springs and compression pads. The pivot point 66 may be replaced or augmented by a device to constrain the biased sprocket 64 to move in a designated direction, such as a slider and complementary track. Alternatively the biased sprocket 64 may be positioned externally of the tensioned chain 36 and may be biased to push the tensioned chain 36 towards the first sprocket 30 and/or the output drive sprocket 62 in order to maintain the tension in the tensioned chain 36. Any suitable alternative system of maintaining the tension of the tensioned chain 36 may be substituted for the biased sprocket 64. There may be one or more additional biased sprockets 64 or other tensioning systems, for example located symmetrically between the first sprocket 30 and the output drive sprocket 62, on the right of FIG. 5 as illustrated. Providing two or more tensioning systems may necessitate recalculation of the orbit track 48 to achieve the desired offset step for each revolution of the orbit sprocket 40. The biased sprocket 64 may be omitted in favour of biasing of the output drive sprocket 62 away from the first sprocket 30, in which case angled, splined or sliding shafts may be required to replace output shaft 32.

The output gear train of the second embodiment may be modified by the use of a chain drive and sprockets instead of the intermediate gear 72. More or fewer gear stages may be provided as necessary for the application. The gear ratio between the first ring gear 74 and the first drive gear 70 may be different to that between the first sprocket 30 and the output drive gear 62 in order that the second ring gear 78 either leads or lags the first sprocket 30 when the orbit sprocket 40 is stationary. Advantageously, such a lead or lag can drive the driven device 34 to a failsafe position thereby improving the safety, reliability or service disruption caused by a failure.

The motor 42 is shown schematically and may be any suitable type of motor including a hollow motor. The relative positioning of the components is exemplary; other arrangements achieving the same inventive effect are considered to be within the scope of the present invention.

The drive mechanism may be extended to control driven devices 34 in two different rotating frames of reference. This may require an additional tensioned chain with a separately activated orbit sprocket to provide a compound offset to a second output drive sprocket. A simple version of this extension provides two or more output drive sprockets 62 with an orbit sprocket and associated components arranged to orbit each in order to offset its angular orientation. The revolution of the orbit sprocket 40 around the first sprocket 30 would therefore act to offset all the output drive sprockets 62. This arrangement could find utility in a dual row propeller arrangement wherein one row of rotor blades requires a different pitch adjustment to the other row but both rotor stages rotate in synchronicity. The drive mechanism may be further extended to control driven devices 34 in more than two different frames of reference.

The length and/or shape of the arm 46 may be altered for a whole revolution of the orbit sprocket 40 to change the radius of the orbit track 48 and thereby alter the size of the relative angular offset step. Alternatively the orbit track 48 may be non-circular, by changing the length and/or shape of the arm 46 over the course of a revolution of the orbit sprocket 40. This enables the amount of rotational offset achieved at a given angular position of the orbit sprocket 40 around the first sprocket 30 to be varied and has benefits in applications where the movement of the orbit sprocket 40 is designed to be arrested at positions other than that shown in FIG. 5. The arm 46 may also have a different shape to improve the couple between the orbit sprocket 40 and the tensioned chain 36. The reference rotation source 54 and driven device 34 may be switched with the consequence that the torque would flow through the gear train in the opposite direction.

Although the present invention has been described with respect to a propeller rotor blade system, particularly for changing the pitch of the rotor blades of a rotor stage of the propeller, it is equally applicable in other applications. For example it can be used to control the gear ratio, braking, camber, or any other parameter of a vehicle wheel in a car, van, farm vehicle, train or aircraft. It may be used in a robot, crane or industrial machine, for example to control the angle and position of a robot or crane arm with the majority of the weighty components situated in the base of the robot or crane. The drive mechanism could also be used in a turret vehicle, such as a tank, excavator or fairground ride, to control a parameter, for example the elevation of a gun or excavating scoop, on the turret from within the vehicle. Alternatively it may be used to alter the gear ratio and synchronisation between multiple riders on a bicycle, for example between two riders of a tandem, or between one or more riders and a motor. It could vary the gear ratio to a regenerative motor or flywheel so that it can be turned quicker to store energy and slower to release it.

The present invention is equally applicable in applications where the first sprocket 30 and/or output drive sprocket 62 are non-circular, permitting torque or speed variations or periodic angular offset of the output compared to the input without revolution of the orbit sprocket 40.

Although the orbit sprocket 40 has been described as a sprocket, with or without teeth, it may alternatively be a radially thin device similar in profile to a car engine camshaft timing chain tensioning device. This minimises the wear on the tensioned chain 36 without requiring the orbit sprocket 40 to rotate about its own axis, minimises the required length of the tensioned chain 36 and reduces the travel required by biased sprocket 64 by locating the output drive sprocket 62 and biased sprocket 64 close to the first sprocket 30.

What is claimed is:

1. A drive mechanism comprising:
   a first sprocket encircled by a tensioned chain;
   an orbit sprocket arranged to orbit the first sprocket in response to a resynchronisation signal, the orbit sprocket arranged to displace the tensioned chain relative to the first sprocket;
   characterised in that the first sprocket is rotatable and is coupled to an output drive sprocket by the tensioned chain such that the first and output drive sprockets are rotatable in synchronicity, whereby the orbit of the orbit sprocket alters the relative angular orientation of the first and output drive sprockets.

2. A drive mechanism as claimed in claim 1 wherein the first sprocket is coupled to a reference rotation source and the output drive sprocket is coupled to a driven device.

3. A drive mechanism as claimed in claim 2 wherein the output drive sprocket is coupled to the driven device via a gear train.

4. A drive mechanism as claimed in claim 3 wherein the output drive sprocket is coupled to the driven device via a reduction gear train.

5. A drive mechanism as claimed in claim 2 wherein the reference rotation source is a rotor stage of a gas turbine engine.

6. A drive mechanism as claimed in claim 2 wherein the first sprocket is in one frame of reference and the driven device is in another frame of reference.

7. A drive mechanism as claimed in claim 6 wherein the frames of reference rotate with respect to each other.

8. A drive mechanism as claimed in claim 6 wherein one frame of reference is stationary.

9. A drive mechanism as claimed in claim 1 wherein the tensioned chain is tensioned by a biased sprocket.

10. A drive mechanism as claimed in claim 1 wherein the resynchronisation signal activates a motor that causes the orbit sprocket to orbit the first sprocket.

11. A drive mechanism as claimed in claim 1 wherein a further orbit sprocket is arranged to orbit the output drive sprocket to further alter the relative angular orientation of the first and output drive sprockets.

12. A drive mechanism as claimed in claim 11 wherein two or more output drive sprockets are coupled to the first sprocket by the tensioned chain, each having a further orbit sprocket arranged to orbit it to alter the relative angular orientation of the first sprocket and the output drive sprocket that is orbited.

13. A drive mechanism as claimed in claim 11 wherein the driven device is a rotor pitch mechanism.

14. A drive arrangement comprising two or more drive mechanisms as claimed in claim 1, the two or more drive mechanisms being coupled together.

15. A contra-rotating propeller gas turbine engine comprising:
   an air intake,
   a compressor,
   combustion equipment,
   a turbine,
   an exhaust nozzle,
   a nacelle generally surrounds the engine and defining the intake and nozzle and a core exhaust duct,
   two contra-rotating propellers attached to and driven by the turbine which propellers include contra-rotating blade arrays, and
   a drive mechanism for controlling the pitch of the propellers and having
      a first sprocket encircled by a tensioned chain;
      an orbit sprocket arranged to orbit the first sprocket in response to a resynchronisation signal, the orbit sprocket arranged to displace the tensioned chain relative to the first sprocket characterised in that the first sprocket is rotatable and is coupled to an output drive sprocket by the tensioned chain such that the first and output drive sprockets are rotatable in synchronicity, whereby the orbit of the orbit sprocket alters the relative angular orientation of the first and output drive sprockets.

* * * * *